Aug. 22, 1950 — J. A. HUNTER — 2,519,657
SAFETY CHAIN ANCHORAGE FOR AGITATORS
WITH SUSPENDED BAFFLE
Filed April 12, 1950
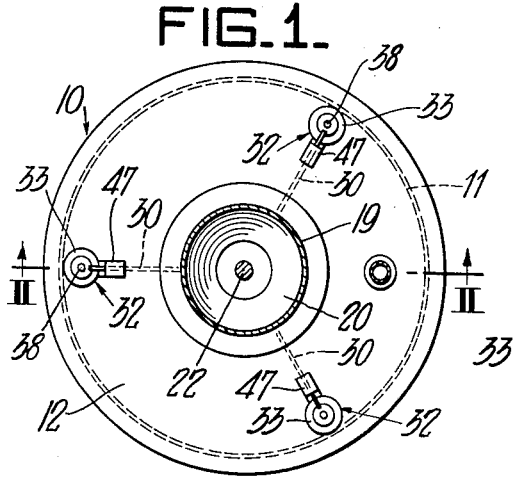
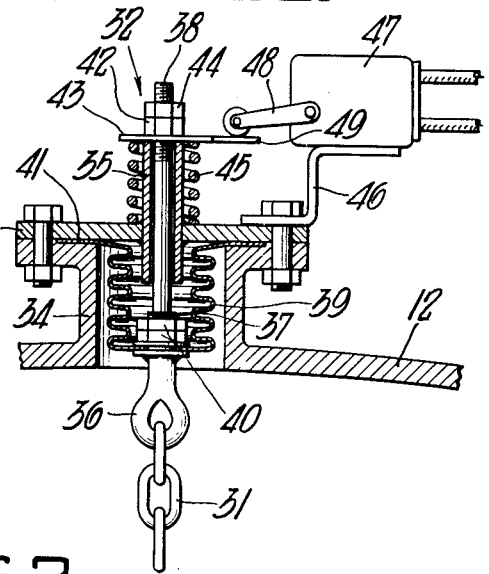
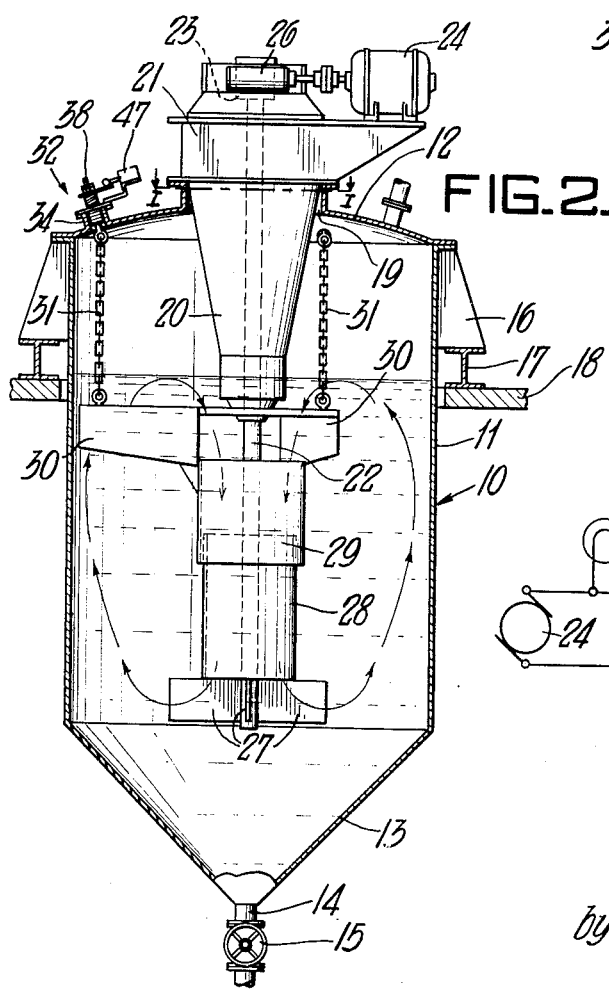
Inventor:
JOHN A. HUNTER,
by: Donald G. Dalton
his Attorney.

Patented Aug. 22, 1950

2,519,657

UNITED STATES PATENT OFFICE 2,519,657

SAFETY CHAIN ANCHORAGE FOR AGITATORS WITH SUSPENDED BAFFLE

John A. Hunter, West Mifflin Borough, Allegheny County, Pa., assignor to Carnegie-Illinois Steel Corporation, a corporation of New Jersey Application April 12, 1950, Serial No. 155,423

4 Claims. (Cl. 259—1)

This invention relates to agitators and particularly to those of the upright cylindrical type having a vertical impeller shaft and cylindrical and radial baffles suspended from the cover or top. Specifically the invention concerns an improved safety anchorage for the chains supporting the baffles.

Agitators of the type mentioned have proved desirable for many applications. The chains supporting the baffles, however, are subject to severe working conditions and failure thereof sometimes occurs. On starting the impeller, the baffles are turned through a substantial angle by the whirling tendency of the liquid, until an equilibrium is reached in which the torque applied to the radial baffles by the liquid is balanced by that resulting from the lifting caused by the partial rotation thereof. Even after that time, however, the chains are subject to considerable movement and vibration by the liquid flow causing accelerated wear thereof. Failure of a baffle-suspending chain is a serious matter because it throws the baffles off-center causing them to drag on the impeller. This may cause breakage of the remaining chains whereupon the baffles may become jammed up between the impeller and agitator wall resulting in serious damage. Usually, in fact, the failure of one chain is not detected until this final result has occurred, stopping rotation of the impeller. The agitating efficiency of the apparatus is impaired, furthermore, after the breakage of one chain, even though the impeller is able to continue rotation for awhile, and the quality of the product may be adversely affected.

I have invented a novel safety anchorage for the chains supporting agitator baffles, whereby the failure of a single chain automatically causes immediate stoppage of the impeller and gives an alarm to notify the operator, thus precluding damage to the apparatus resulting from continued operation thereof while the baffles are not properly supported. In a preferred embodiment, I provide suspension bolts extending through the cover or top of the agitator, to which the baffle-suspending chains are attached. Each bolt extends through a tube penetrating the cover and bears on the outer end thereof. A compression spring on the bolt constantly tends to raise it but is normally prevented from doing so by the load of the suspended baffles. An electric switch is disposed adjacent each bolt so as to be operated thereby on lifting of the bolt by the spring which occurs immediately on failure of the chain. The bolt-operated switches are effective to shut down the motor driving the agitator impeller and cause a signal to be given so that the necessary repair can be made before any damage ensues.

A complete understanding of the invention may be obtained from the following detailed description and explanation which refer to the accompanying drawings illustrating a preferred embodiment.

In the drawings:

Figure 1 is a horizontal section through the neck of an agitator of the type described, having the invention incorporated therein;

Figure 2 is a vertical section taken along the plane of line II—II of Figure 1, showing parts in elevation; line I—I of Figure 2 indicates the plane on which the section of Figure 1 is taken;

Figure 3 is a portion of Figure 2 to enlarged scale showing the details of my improved chain anchorage; and Figure 4 is a simplified circuit diagram showing how the bolt-operated switches control the impeller motor and an alarm or signal device.

Referring now in detail to the drawings and, for the present, to Figures 1 through 3, an agitator of the type described indicated generally at 10, comprises an upright cylindrical portion 11 having a cover or top 12 removably disposed thereon and a conical bottom 13 provided with a drain outlet 14 having a control valve 15. The chamber thus defined is supported by radial bearing plates 16 secured thereto at circumferentially spaced points. The plates 16 are adapted to rest on supporting feet 17 standing on a floor 18 or other supporting structure.

The cover 12 has a neck defining a central opening 19 through which extends a cone 20 and surmounted by an impeller mounting 21 both fabricated from metal plate. An impeller shaft 22 extends axially through the cone 20 and mounting 21 being supported by a suitable radial and thrust bearing 23 carried on the latter. A motor 24 stands at one side of mounting 21 and drives the shaft 22 through a worm and worm wheel 26. An impeller 27 is mounted on the lower end of shaft 22. A cylindrical rotating baffle 28 is carried on the impeller 27 and extends upwardly therefrom. A relatively fixed cylindrical baffle 29 fits down over the upper end of rotating baffle 28 and is provided with radial baffles 30 spaced circumferentially thereof. The baffles 29 and 30 are suspended by chains 31 depending from the cover 12. The structure thus far described is conventional and forms no part of my invention.

My improved safety chain anchorage is indicated generally at 32. As shown in detail in Figure 3, it includes a supporting plate 33 adapted to be removably secured to a flanged port or opening 34, three or more of which are spaced circumferentially of the cover 12. A guide and bearing tube 35 extends through a central hole in the plate 33 and is welded thereto. An eye bolt 36 is inserted through the tube 35 with its eye downward and one of the chains 31 is attached thereto. The bolt 36 has a short threaded shank portion 37 adjacent the eye, the remainder of the shank designated 38 being turned down to a small diameter and threaded. An expansible and collapsible sealing sleeve 39 has its inner end sealed to the bolt shank adjacent the eye by nuts 40 turned on the shank portion 37. The outer end of the sleeve has a flange 41 sealed between the plate 33 and the flange of port 34.

A nut 42 turned on the shank portion 38 of bolt 36 has a bearing disc or plate 43 welded thereto adapted to rest on the upper end of bearing tube 35. The bolt 36 may be adjusted vertically by turning the nut 42 thereon. A lock nut 44 cooperates with the latter to hold it in adjusted position. A helical spring 45 is compressed between the plate 33 and plate 43 and constantly exerts an upward force on the bolt 36. The spring is so designed that it is incapable of overcoming the load normally applied to the chains 31 but is effective to lift the bolt on failure of the chain. A bracket 46 is secured to the plate 33 and mounts an electric switch 47 having an operating lever 48 in such position adjacent the bolt 36 that the lever will be actuated by a finger 49 projecting laterally from plate 33. This operation, of course, will occur only when the normal load on the chain 31 is relieved as by breakage thereof.

Figure 4 shows a schematic circuit diagram illustrating one mode of utilizing my improved safety anchorage for automatically controlling the motor 24 to shut it down and give a signal on breakage of any one of the chains 31 supporting the baffles 29 and 30. As shown in Figure 4, motor 24 is connected to a supply circuit 50 through three switches 47, one of which is mounted adjacent each of the safety suspensions 32, and a manual disconnecting switch 51. A signal lamp 52 is connected across the motor 24. Thus, so long as all the chains 31 remain whole and under normal load, the motor 24 may be started by closing switch 51, all the series-connected switches 47 being closed. On starting the motor, of course, signal lamp 52 is energized. Normal operation of the agitator continues thereafter as long as desired, effecting circulation of the liquid contained in the agitator chamber as indicated by the arrows. Should any one of the baffle-supporting chains 31 break, its spring 45 immediately raises the bolt 38 thereof whereupon finger 49 of plate 43 trips lever 48 of the associated switch 47. As clearly shown in Figure 4, the opening of any one of the switches 47 immediately de-energizes motor 24 and signal lamp 52. Operation of the impeller is thus automatically stopped before any damage to the agitator or the baffles therein can result from unsymmetrical support of the latter by the chains remaining unbroken. Switch 51 is then opened and the broken chain replaced by removing cover 12 and the parts carried thereby from the cylindrical body portion 11 of the agitator. After replacement of the broken chain, the agitator is again ready for operation as soon as the cover 12 is restored.

The collapsible sleeve 39 effectively seals the opening or port 34 in the agitator cover 12, yet permits the axial adjustment of the bolt 36 to secure the proper location of the baffles and equalization of the load thereof among the several suspensions 32. This seal need not be broken for replacement of the broken chain if the cover 12 is removed for this purpose, although access to the chamber is necessary either by this means or by lifting the plate 33 of the suspension where the break in the chain has occurred. It may therefore be necessary in some cases to drain the contents of the agitator before replacing the broken chain.

Although I have illustrated and described only a preferred embodiment of the invention, it will be recognized that changes in the details thereof may be made without departing from the spirit of the invention or the scope of the appended claims.

I claim:

1. A safety anchorage for the chains suspending baffles in an upright cylindrical agitator from the cover thereof comprising a plate adapted to be removably secured over an opening in the cover, a tube extending through the plate normal thereto, a bolt slidable in the tube, the chain depending from the lower end of the bolt, a bearing disc on the bolt adapted to engage the outer end of the tube and a helical spring compressed between said plate and said disc effective to lift the bolt on failure of the chain.

2. A safety anchorage for a suspension member comprising a supporting plate, a guide tube secured endwise to the plate, a bolt passing through the tube, a suspension member secured to the bolt, a disc on the bolt normally bearing on the upper end of the tube, a helical spring compressed between said disc and said plate effective to lift the bolt on failure of said member, a switch adjacent the bolt and means on the bolt adapted to operate the switch on uplift of the bolt.

3. A safety anchorage for the chains suspending a baffle in an upright cylindrical agitator having a top, comprising guide tubes extending through said top, one for each chain, a suspension bolt extending through each tube, the chains hanging from the lower ends of the bolts, respectively, a helical spring surrounding each tube constantly tending to lift the bolt thereof and a switch adjacent each bolt adapted to be operated by upward movement thereof.

4. The apparatus defined by claim 3 characterized by said top having openings therein, one for each chain, and a removable plate overlying each opening, each of the tubes extending through one of said plates and being secured thereto.

JOHN A. HUNTER.

REFERENCES CITED

The following references are of record in the file of this patent:

UNITED STATES PATENTS

| Number | Name | Date |
| --- | --- | --- |
| 1,433,125 | Edmands | Oct. 24, 1922 |
| 1,651,816 | Goldman | Dec. 6, 1927 |
| 1,715,545 | Epstein | June 4, 1929 |
| 2,443,533 | Dooley | June 15, 1948 |
| 2,458,774 | Gabel | Jan. 11, 1949 |
| 2,491,656 | Goldman | Dec. 20, 1949 |